Nov. 26, 1929.　　　L. J. HOIS　　　1,737,240

STEAMER ROASTER

Filed May 23, 1927

INVENTOR.
Louis J. Hois
BY
ATTORNEYS.

Patented Nov. 26, 1929

1,737,240

UNITED STATES PATENT OFFICE

LOUIS J. HOIS, OF MILWAUKEE, WISCONSIN, ASSIGNOR TO GEUDER, PAESCHKE & FREY COMPANY, OF MILWAUKEE, WISCONSIN

STEAMER ROASTER

Application filed May 23, 1927. Serial No. 193,430.

This invention relates to a combined cooker and roaster.

An object of the invention is to provide a combined cooker and roaster which effects the major cooking of the meat or the like in an atmosphere of vapor or steam and which, in the final stages of the cooking, subjects the meat or the food to a comparatively dry heat to effect the desired browning thereof. In this way the nutritious and tasty juices and ingredients of the meat or the like are retained and a moist and tender condition is obtained. Only a small quantity of juices or the like runs out of the meat when cooked in this way and such juices are preserved in a moist unburned state or condition wherein they are best adapted for such uses as they may be put. Along with these advantages the cooking is carried out in such an efficient manner as to result in economy in the consumption of fuel and also in the consumption of the water utilized in conjunction with the device.

A further object is to provide a combined steamer and roaster having these advantages and capacities and which is of simple, durable construction, reliable and effective in operation, easily handled and manipulated and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1:
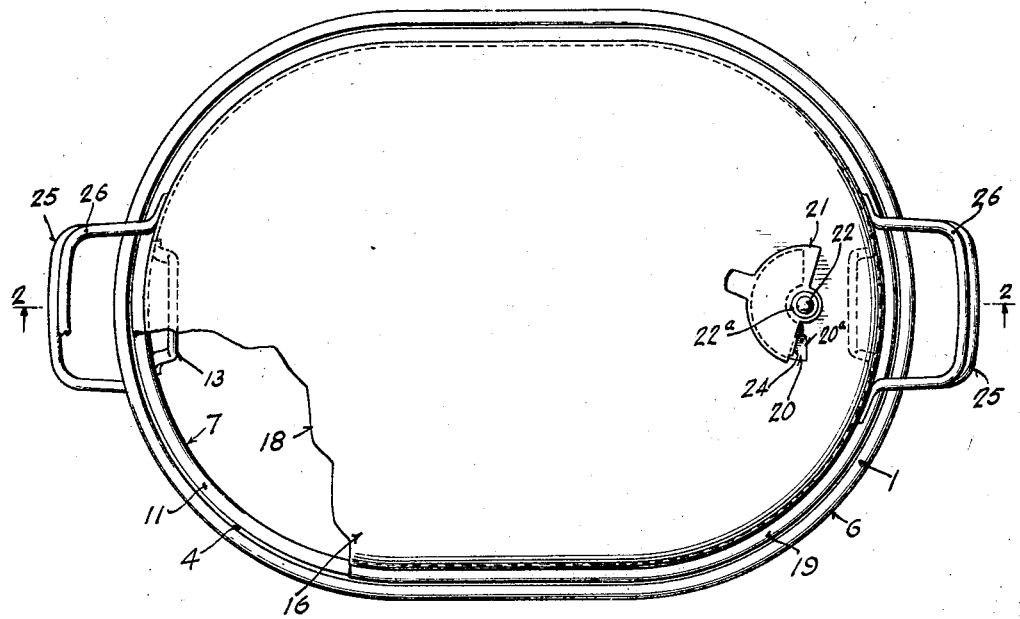
Figure 1 is a plan view showing a combination steamer and roaster embodying the present invention, a portion of the cover being broken away for the sake of illustration.

Referring to the drawings it will be seen that the combination roaster and cooker contemplates a base section designated generally at 1 and made up of a bottom 2 and a vertical peripheral wall 3. This base section 1 is preferably of elongated form and provides the main receptacle for the various parts of the device, as will clearly appear as the description proceeds.

The upper end of the base section 1 is opened and adjacent this upper end but, spaced therefrom, the marginal or vertical wall 3 is formed with a shoulder 4 which extends entirely around the base section. Above the shoulder 4 a vertical flange 5 is provided and also extends entirely around the base section. The flange 5 is formed with a rolled rim 6.

Figure 2:
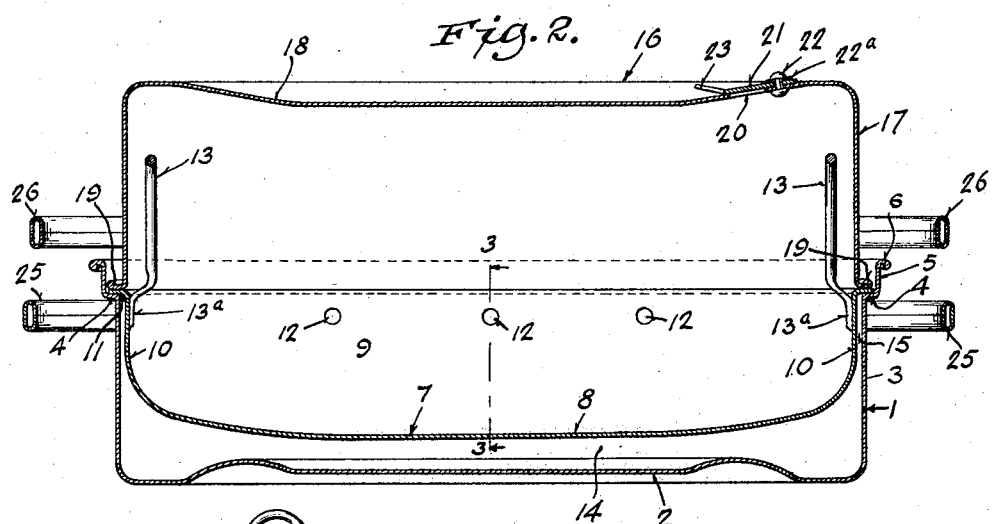
Figure 2 is a view in longitudinal vertical section on line 2—2 of Figure 1.
Figure 3:
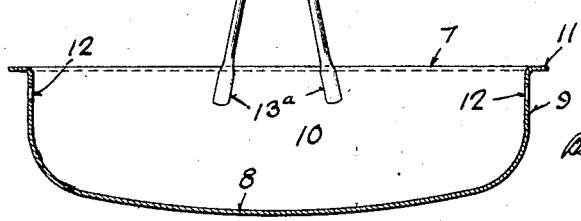
Figure 3 is a detail sectional view on line 3—3 of Figure 2.

A tray designated generally at 7 is provided and consists of a bottom 8 somewhat rounded and merging into side walls 9 and end walls 10. Around the upper margin of the tray an outwardly extended flange 11 is provided, the flange 11 being integral with the side and end walls. Below the flange 11 the side walls 9 are formed with vents 12 which open laterally into the tray. At the ends of the tray handles 13 are provided and project upwardly beyond the tray, as shown in Figure 2. The handles 13 are offset inwardly from the end walls of the tray and to provide for this, the attaching portions 13ª of the handles are offset from the body thereof and suitably fastened to the end walls of the tray. In assembly the tray is set into the base section and its flange rests on the shoulder 4 thereby suspending the tray within the base section 1, as clearly shown in Figure 2. When so suspended the tray has its bottom 8 spaced from the bottom 2 of the base section 1 to define a water chamber 14 and the side and end walls of the tray are also spaced from the vertical wall of base section to define a steam or vapor space 15. The steam or vapor space 15 extends entirely around the base section and is entirely cut off from the interior of the tray and from the atmosphere except for such communication as is afforded through the laterally directed vents 12.

A cover section designated generally at 16 is provided and has a marginal wall 17 of the same shape of the wall 3 of the base section though slightly smaller. Integral with this vertical or marginal wall 17 is a top wall 18. The lower end of the cover section is open. Around the margin of the lower end of the wall 17 of the cover section 16 an outwardly directed horizontal flange 19 is integrally formed. In the assembly the cover section is positioned as shown in Figure 2 wherein its flange 19 rests on the flange 11 of the tray 7, this flange 19 and the lower end portion of the cover section being received within the pocket or space defined by the vertical flange 5 of the base section. The flange 11 of the tray is designed to snugly fit against the shoulder 4 and the union or joint thus effected is substantially tight as this flange 11 is urged with considerable force against its seat or shoulder 4. It is obvious that not only the weight of the tray and its contents but also the weight of the cover section tends to force this flange 11 against the seat or shoulder 4.

The top 18 of the cover section is formed with one or more vents 20. Each vent 20 is provided with a vent closure 21 having the form of a suitably shaped plate pivoted as at 22 to the top wall 18 so as to be positionable to overly and obstruct the vent as well as to be positionable in angularly spaced relation to the vent in which adjustment of the closure 21 the vent 20 is open and unobstructed. The pivot 22 may be sufficiently tight and presents sufficient frictional resistance to the turning of the closure 21 to releasably hold it in any adjustment. The pivot 22 has a friction washer 22$^a$ associated therewith for this purpose.

A finger piece 23 is integrally formed with the vent closure 21 to facilitate its manipulations, and a downwardly directed stop lug 24 is also provided on the vent closure 21 to limit its movement in either direction. The stop lug is engageable with portions of the wall of the vent opening 20 and to permit complete closure this vent opening 20 may have a notch 20$^a$ receiving the stop lug 20 in the closed position of the vent closure 21. A pair of handles 25 are provided on the base section 1. Similar handles 26 are provided on the cover section 16.

In use a quantity of water is placed in the base section 1. Only a small quantity is needed and the level of the water is at or below the level of the bottom of the tray. The tray is then put in place and the meat or other food, after having been suitably prepared, is placed within the tray. The handles 13 facilitate the manipulation of the tray. The cover section 16 is then set in position. In the initial phases of the roasting or cooking the vent closure 21 is closed, that is, it is positioned to completely obstruct the vent opening 20. When the water in the base section below the tray is heated vapor or steam is formed and rises into the steam space 15. From the steam space 15 the vapor of steam passes horizontally or laterally into the tray and against the meat or other food therein. It is to be noted that the tray and the cover section define a relatively large cooking or roasting chamber in which the steam acts to best advantage on the meat or other food. In this way there is produced an atmosphere of highly heated vapor or steam in which the meat is cooked and this not only tends to bring about a moist and tender condition in the meat but also retains in the meat all of its tasty and nutritious juices and substances. In the final phases of the cooking, the vent 21 is opened to permit the steam or vapor to escape, thereby finally cooking or roasting the meat or other food in a comparatively dry atmosphere which is desirable for full browning of the meat or the like. It has been found that with a combination steamer and roaster of this character but little fuel is used for the reason that after the water is once highly heated only a very moderate heat is required to sustain the cooking operation. The device uses so little water that replenishment is never required and in fact a substantial bulk thereof is left after the cooking has been completed.

The device is adapted for roasting practically anything that may be roasted, and may be used with all the various kinds of meat, poultry, game, fish, or the like.

The invention claimed is:

1. A combination steamer and roaster comprising an imperforate base section, having a seat around its upper end, a removable tray adapted to contain the meat to be roasted, and having an imperforate bottom and an upwardly directed peripheral wall, that portion of the wall adjacent to the bottom being imperforate, the upper edge of said wall being formed with an outwardly directed flange supported on said seat, whereby the tray is suspended within the base section in spaced relation thereto defining a water space of substantial volume and a vapor space above the water space, said tray having vents affording communication between the vapor space and the interior of the tray, and a cover section cooperable with the tray to form an enclosed roasting chamber, said cover section having a vent and a closure for the vent adjustable to a position wherein it obstructs the vent and also adjustable to a position wherein it leaves the vent open and unobstructed.

2. A combination steamer and roaster comprising a base section including a bottom and an upwardly directed peripheral wall formed with an annular seat near its upper end and with an upwardly extending flange around the outer margin of said seat, a removable food supporting tray having an imperforate bottom wall and an upwardly directed peripheral wall, the upper edge of said wall being formed with an outwardly directed marginal flange around its upper end, said flange overlying the annular seat of the base section and fitting snugly thereagainst within said upwardly directed flange and suspending the tray within the base section in spaced relation thereto, the spaced tray and base defining a water space of substantial volume and a steam and vapor space above the water space, said tray having vents extending laterally through the upper portion of its peripheral wall affording communication between the steam or vapor space and the interior of the tray, the tray being otherwise imperforate, a removable cover section including a peripheral wall, the lower end of which is provided with an outturned flange accommodated within said upwardly extending flange of the base section and resting on the outwardly directed flange of the tray whereby the weight of the cover section aids in maintaining a vapor-tight joint between the flange of the tray and the annular seat of the base section and whereby lateral displacement of the cover and tray is prevented, said cover section having a vent, and a closure for the vent adjustable to a position wherein it obstructs the vent and prevents the escape of the steam or vapor whereby to steam the food supported on the tray, said closure also being adjustable to a position wherein it leaves the vent unobstructed so that the steam or vapor is expelled therethrough whereby the food in the tray is subjected to the cooking action of substantially dry heated air.

In witness whereof, I hereto affix my signature.

LOUIS J. HOIS.